S. SHIMAMOTO.
BASKET FORMED BEARING METAL.
APPLICATION FILED DEC. 4, 1919.

1,369,848.

Patented Mar. 1, 1921.

Inventor
Saichi Shimamoto
By B. Singer,
Attorney

UNITED STATES PATENT OFFICE.

SAICHI SHIMAMOTO, OF TOKYO, JAPAN.

BASKET-FORMED BEARING METAL.

1,369,848.　　　　　　Specification of Letters Patent.　　Patented Mar. 1, 1921.

Application filed December 4, 1919. Serial No. 342,455.

*To all whom it may concern:*

Be it known that I, SAICHI SHIMAMOTO, citizen of Japan, residing at Yeguramachi IV No. 6, Azabuku, Tokyo, Japan, have invented new and useful Improvements in Basket-Formed Bearing Metal, of which the following is a specification.

This invention relates to metal bearings composed of rings formed of interlaced spiral springs. One object of the invention is to facilitate the rotation of the axle while the other objects consist of improving the supply of oil thereto and of the prevention of heating, as the invention diminishes the friction surface.

Figure 1:
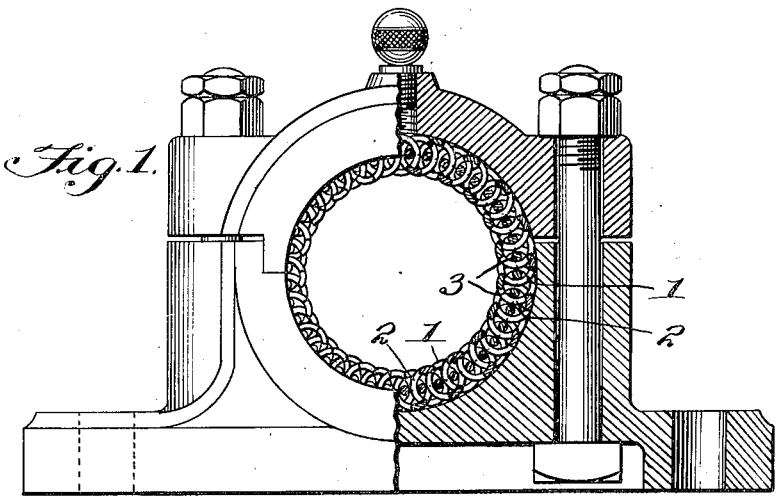
Figure 2:
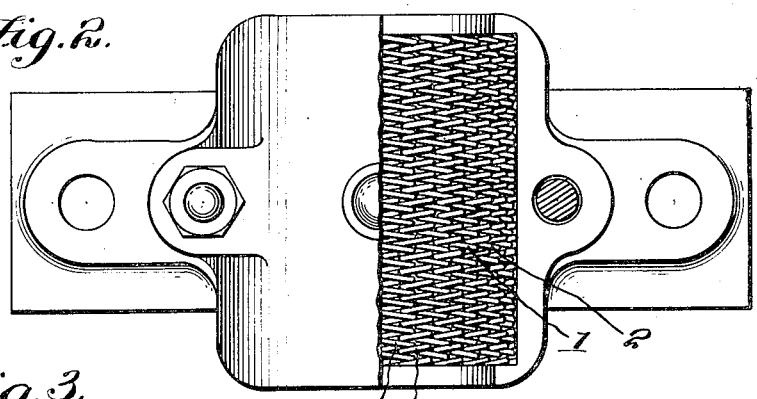
Figure 3:
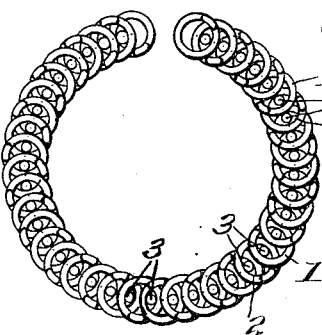
Figure 4:
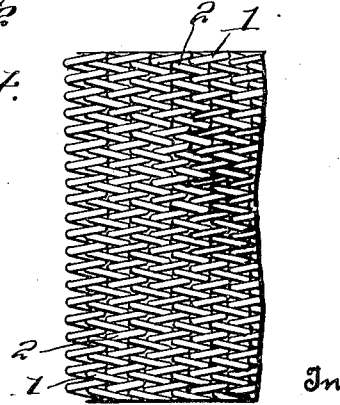

Referring to the accompanying drawings, which form part of this specification, Figure 1 is a half vertical section and half side view of a bearing fitted with my invention, Fig. 2 a plan view thereof, Fig. 3 a plan view of the bearing surface developed, and Fig. 4 a side view thereof.

Like letters refer to similar parts throughout the drawings.

In this invention a spiral spring of right-handed coil 1 and another spring of left-handed coil 2 are alternately arranged and with their coils engaging each other, and at the place where they interlace with the adjacent springs a prop or stay 3 is introduced so that a cylinder of basket-like form is produced; or the expanded spring is introduced into the axle bearing unfastened, coiled around the axle and a prop or stay 3 is inserted to apply it to the axle; then the bearing is closed for use.

To maintain the cylinder in form a small quantity of Babbitt metal is fused into the ends of the cylinder. The metal cylinder is to be used with an axle bearing recessed or cut out to receive it, as shown in Fig. 2.

As this metal bearing is of open form the friction surface is diminished, the axle runs easily, and moreover as the oil can follow the rotation of the axle, its supply is most perfect, while the bearing is heatless owing to the ventilation afforded by the open form, and consequently the invention offers many advantages for avoiding damage to the axle and to its bearing.

What I claim is:—

1. A cylindrical metal bearing composed of rings formed of spiral springs interlaced in open form.

2. A cylindrical metal bearing of interlaced springs provided with the prop or stay at the place where one spring interlaces with an adjacent spring, right-handed spiral springs and left-handed spiral springs being alternately arranged and engaging each other.

3. A cylindrical metal bearing of interlaced springs having Babbitt metal fused into the cylinder ends thereof, and with a prop or stay introduced at the place where one spring interlaces with an adjacent spring, right-handed spiral springs and left-handed spiral springs being alternately arranged and engaging each other.

In testimony whereof I have signed my name to this specification in the presence of two subscribing witnesses.

SAICHI SHIMAMOTO.

Witnesses:
　TSUGETARO KARA,
　KAZAS SHIRAKAWA.